United States Patent [19]

Johnson

[11] 4,245,220
[45] Jan. 13, 1981

[54] TARGET LOCATION SYSTEMS

[75] Inventor: Phillip L. M. Johnson, Yeovil Marsh, Nr. Yeovil, England

[73] Assignee: Plessey Handel und Investments AG, Zug, Switzerland

[21] Appl. No.: 29,539

[22] Filed: Apr. 12, 1979

[30] Foreign Application Priority Data

Apr. 14, 1978 [GB] United Kingdom ............... 14693/78

[51] Int. Cl.³ .................... G01S 3/14; G01S 13/06; G01S 15/06
[52] U.S. Cl. ..................... 343/16 R; 343/113 DE; 343/123; 367/102
[58] Field of Search ............... 343/17.2 PC, 113 DE, 343/123, 16 R; 367/102

[56] References Cited

U.S. PATENT DOCUMENTS

| | | | |
|---|---|---|---|
| 2,519,521 | 8/1950 | Weighton | 343/123 X |
| 3,012,222 | 12/1961 | Hagemann | 343/16 R X |
| 3,025,517 | 3/1962 | Watson et al. | 343/16 R |
| 3,068,474 | 12/1962 | Higgins et al. | 343/123 X |
| 3,119,998 | 1/1964 | Foley | 343/16 R |
| 3,386,097 | 5/1968 | Richter et al. | 343/113 DE |
| 3,614,786 | 10/1971 | Goggins, Jr. | 343/5 HM X |

Primary Examiner—Malcolm F. Hubler
Attorney, Agent, or Firm—Fleit & Jacobson

[57] ABSTRACT

A target location system comprising a signal transmitter arrangement for transmitting pulses the frequency of which increase progressively during each pulse period from a frequency f to a frequency $f + \Delta f$ and an echo signal receiver arrangement comprising a pair of echo signal receiver transducers arranged in spaced apart relationship, a first mixer having two input signal terminals fed from the said transducers one transducer being fed from each terminal, a second mixer via which one transducer of the pair is arranged to feed the first mixer, the second mixer being fed with a local oscillator signal, a first filter via which one sideband output signal from the said second mixer is fed to the said first mixer and a plurality of bandpass filters forming a filter bank fed from the first mixer, the filters of the bank each having a different passband or slot whereby all slots in aggregate cover a predetermined frequency band so that the bearing of a target from which an echo signal is received is indicated in accordance with the slot or slots in which the echo signal is received.

8 Claims, 3 Drawing Figures

TARGET LOCATION SYSTEMS

This invention relates to target location systems.

Conventional sonar systems for determining the bearing of a target have beamformers which require a continuous line array with associated phase or time delay networks to steer the beam in the required direction. The present invention seeks to provide inter alia, a sonar system which does not use phase or time delay networks to form the beam and also does not require a multi-element array.

According to one aspect of the present invention a target location system comprises a signal transmitter arrangement for transmitting pulses the frequency of which increase progressively during each pulse period from a frequency $f$ to a frequency $f+\Delta f$ and an echo signal receiver arrangement comprising a pair of echo signal receiver transducers arranged in spaced apart relationship, a first mixer having two input signal terminals fed from the said transducers one transducer being fed from each terminal, a second mixer via which one transducer of the pair is arranged to feed the first mixer, the second mixer being fed with a local oscillator signal, a first filter via which one sideband output signal from the said second mixer is fed to the said first mixer and a plurality of bandpass filters forming a filter bank fed from the first mixer, the filters of the bank each having a different passband or slot whereby all slots in aggregate cover a predetermined frequency band so that the bearing of a target from which an echo signal is received is indicated in accordance with the slot or slots in which the echo signal is received.

The target location system may be adapted for radar or sonar applications.

In one embodiment according to the foregoing aspect of the invention, the first filter may be a high pass filter.

According to an alternative aspect of the invention the system may include a third mixer via which the other transducer of the pair is arranged to feed the first mixer the local oscillator signal fed to the second mixer being at a frequency which is a harmonic of the local oscillator signal which is fed to the third mixer and a second filter arranged to pass one sideband of the output signal from the third mixer to the first mixer.

In one embodiment according to the alternative aspect of the invention the first and second filters may be low pass filters. In embodiments according to either of the foregoing aspect the first mixer may comprise a multiplicative mixer or alternatively it may comprise an additive mixer feeding the filter bank via an envelope detector.

Some embodiments of the invention will now be described by way of example with reference to the accompanying drawings in which.

Figure 1:
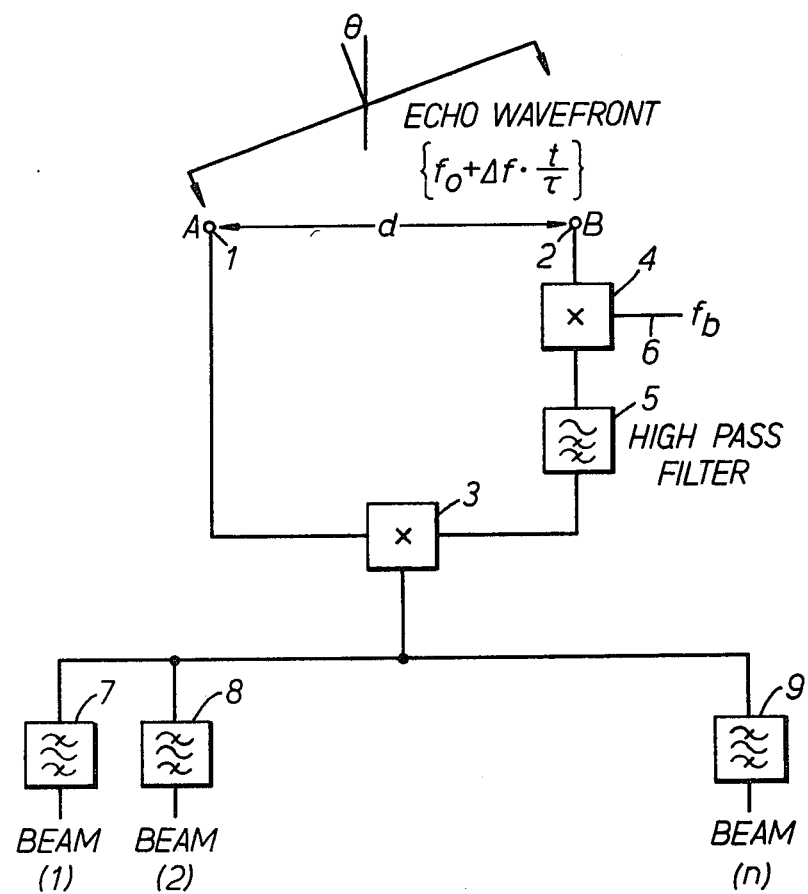
FIG. 1 is a generally schematic block diagram of a receiving arrangement for a sonar system.

Referring now to FIG. 1, a sonar system comprises a sonar signal transmitter (not shown) which produces a sonar transmission signal pulse which increases from a frequency of $f_o$ to a frequency $f_o+\Delta f$ in a time T seconds. A sonar receiver arrangement for receiving echos of the transmitted sonar pulse reflected from targets the bearing of which it is required to determine comprises two transducers 1 and 2 spaced apart by a distance d and arranged to receive an echo of the transmitted signal from a target. It can be seen from FIG. 1 that the echo wave front approaches the transducers 1 and 2 at an angle $\theta$, with respect to a line connecting them. Thus it will be appreciated that the transducer 1 receives a frequency $f_o$ when an echo signal is first detected and at some time t later dependant upon $\theta$ the second transducer 2 receives the same frequency but at this time t the frequency received by the transducer 1 will be $f_o+\Delta f \times (t/T)$. Signals from the transducer 1 are fed directly to a multiplicative mixer 3, whereas signals from the transducer 2 are fed to the multiplicative mixer 3 via a further mixer 4 and a high pass filter 5. The further mixer 4 is fed on line 6 with a local oscillator frequency $f_b$ to provide an offset and the upper sideband output from the mixer 4 is passed by the filter 5 to the mixer 3. It can be seen from FIG. 1 that the output frequency from the mixer 3 will be dependent upon the angle $\theta$ and will remain constant during the pulse period T assuming that the transducers 1 and 2 are not moved during this period. Output signals from the mixer 3 are fed to a filter bank comprising filters 7, 8 and 9 only three of which are shown. The filters 7 and 8 are arranged to cover adjacent bandwidths and the other filters in the band are similarly arranged so that each filter covers a different bandwidth whereby the filter bank as a whole covers a predetermined bandwidth in discrete slots. It will be apparent that the angle $\theta$ indicative of the bearing of a target will be indicated in accordance with which of the filters passes the output signal from the multiplicative mixer 3.

Figure 2:
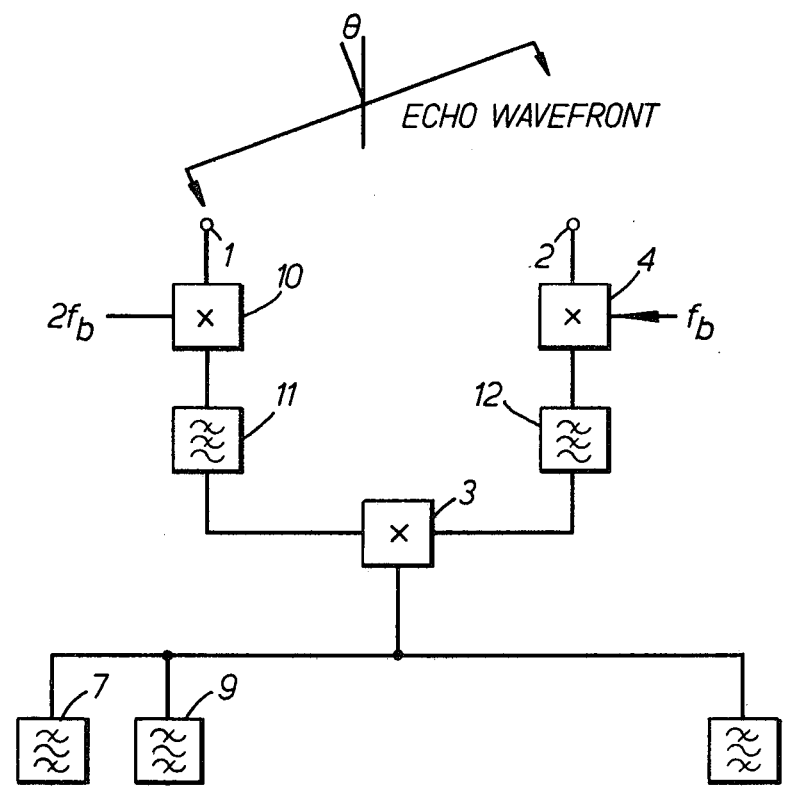
FIG. 2 is a generally schematic block diagram of an alternative receiving arrangement for a sonar system.

FIG. 2 shows a modification of the arrangement of FIG. 1 wherein similar parts bear the same numerical designations. In the arrangement shown in FIG. 2 however, a further mixer 10 is provided having an associated filter 11 but whereas in the arrangement described with reference to FIG. 1 the filter 5 is a high pass filter with the arrangement as shown in FIG. 2 the filter 11 is a low pass filter and the corresponding filter 12 is a low pass filter also. The frequency of the local oscillator signal fed to the filter 10 is $2f_b$ or some other harmonic of the frequency $f_b$ fed to the mixer 4. With this arrangement it will be appreciated that the output frequency from the mixer 3 will vary about $f_b$ in accordance with the bearing of a target.

Figure 3:
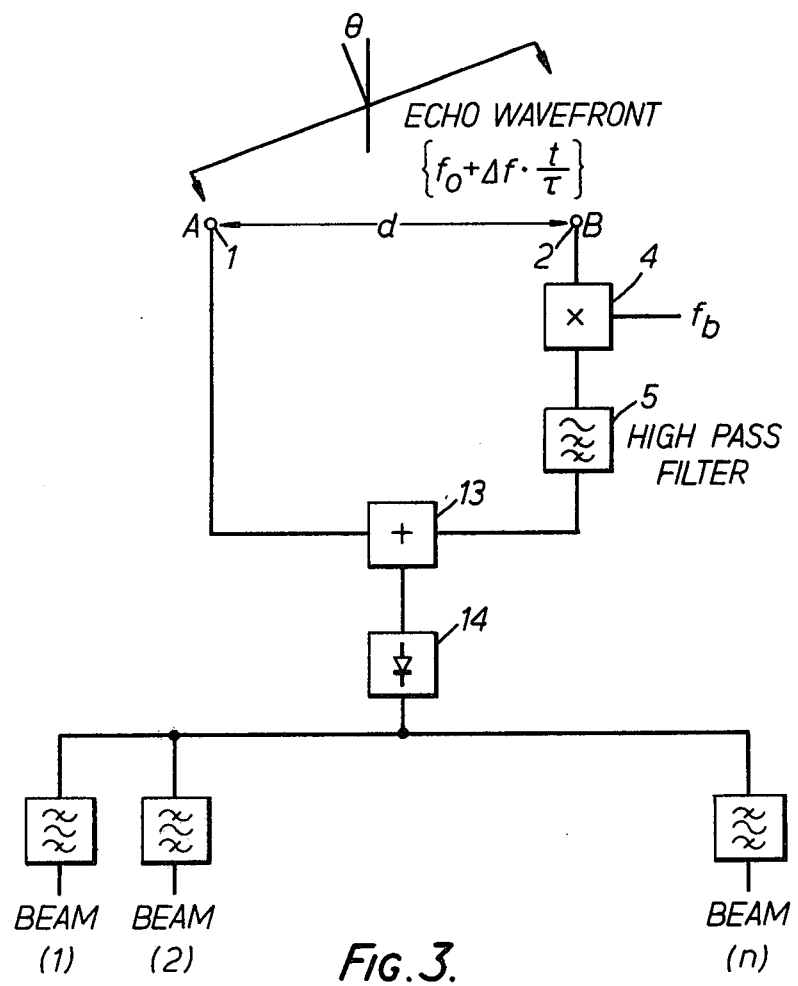
FIG. 3 is a generally schematic block diagram of yet another alternative receiving arrangement for a sonar system.

Turning now to FIG. 3 a receiver arrangement is shown which is similar to the arrangement described with reference to FIG. 1 but in which the multiplicative mixer 3 is replaced by an additive mixer 13 and an envelope detector 14. In any of the foregoing embodiments it will be appreciated that the output signal or signals from filters, such as filter 7, 8 of the filter bank may be fed to any suitable signal processor which provides an indication of the presence of a significant output signal from one or other of the filters. Such a processor may comprise threshold gates whereby only those signals above a predetermined threshold are taken account of.

It will be appreciated that the transmitter transducer should have a directivity pattern such that the sector of interest is covered. The transmitter transmits in effect, frequency modulated carrier. The modulation is such that the frequency changes linearly with time. The signal is received by the two separated receiver transducers or hydrophones. The signal received by one hydrophone is delayed with respect to the other due to the difference in acoustic path length corresponding to a specific bearing. The two signals are then mixed giving rise to a difference frequency which is constant throughout the duration of the pulse from a specific bearing. Filtering the output waveform identifies a particular bearing, the beam pattern of which may be modified by the shape of the filter response and the pulse envelope. Using a parametric source enables broad broad band coverage, this in turn gives good resolution and a large sector coverage. The theory will now be considered;

Consider a transmitted pulse whose carrier frequence f changes linearly with time during the period of the pulse.

$$f = f_0 + \Delta f \cdot (t/T) \quad (1)$$

Its phase $\phi$ at any instant is:

$$\phi = (f_0 \cdot t + \Delta f \cdot (t^2/2T) + \text{Constant})2\pi \quad (2)$$

T is the period of the pulse. If the echo from this pulse is received by two hydrophones 1 and 2 spaced by a distance d (FIG. 1), then the difference in the time of arrival at the two hydrophones resulting from this pulse is proportional to sin $\theta$ (where $\theta$ is the bearing of the echo source). The instantaneous phase of the echo at each hydrophone is:

$$\phi A = (f_0 \cdot t + \Delta f \cdot t^2/2T + \text{Constant})2\pi \quad (3)$$

and $$\phi B = (f_0(t - t')) + \Delta f \cdot ((t - t')^2/2T) + \text{Const})2\pi \quad (4)$$

Where t' is the difference in the time of arrival between the two hydrophones.

The output from hydrophone 1 is then multiplied by a bias frequency $f_b$ and one of the sidebands is removed by filtering e.g. remove the lower sideband giving the resulting phase as:

$$\phi A' = (f_0 t' + f_b t + \Delta f \cdot (t^2/2) + \text{Const})2\pi + (\pi/2) \quad (5)$$

The following process may be achieved using two methods both of which have their advantages and disadvantages.
(a) A multiplicative system as shown in FIG. 1 and FIG. 2, or
(b) An additive system as shown in FIG. 3.

In the multiplicative system the resulting signals from hydrophones 1 and 2 are multiplied together resulting in sum and difference frequencies being generated. It is the difference frequency that is of intereset.

$$\phi A' - \phi B = (f_0 t + f_0 t' + (\Delta W/2\pi)(2tt' - t'^2))2\pi + \pi \quad (6)$$

$\therefore$ Difference frequency $f = f_b + (\Delta f \cdot t'/T)$
Now $t' = (d/c)$ Sin $\theta$ $$\therefore f = f_b + \Delta f \cdot (d/cT) \text{Sin } \theta \quad (7)$$

Hence by selecting $f_b$ such that f never becomes negative for all values of $\theta$ within the sector, the direction from which an echo is received may be identified by a frequency.

Since the system is pulsed there is never only one discrete frequency present at any instant. The bandwidth is defined by the reciprocal of the pulse length T.

Hence the beam width is limited by the pulse length. The resolution of this system is:

$$\Delta\theta = (c/2d) \cdot (1/\Delta f) \text{ radians}$$

Considering now the Additive System (b). This is similar to the multiplicative system just described. The second multiplication stage is however replaced by an adder followed by an energy detector or envelope detector (FIG. 2.) The resulting bearing indentifying frequency is as before:

$$f = f_b + \Delta f \cdot (d/cT) \text{ Sin } \theta$$

The resolution is however only half as good.

$$\Delta\theta = (c/d)(1/f) \text{ radians}.$$

In both systems the outputs are fed into a bank of overlapping filters, the characteristics of which may be used to shape the beam patterns thereby reducing sidelobes. The output from each filter represents one beam and since each beam is sampled independently a parallel system has been achieved.

The advantages of using this system are conventional systems are twofold:
(i) Cost
(ii) Simplicity Since only two hydrophones are used a considerable number of transducers may be omitted and consequently their associated electronics. The beams are formed in the frequency domain and not spatially as with conventional systems.

It will be appreciated that the system could be applied in corresponding Radar Navigation and/or target location systems. Navigation systems being a variant included within the term target location.

I claim:

1. A target location system comprising a signal transmitter arrangement for transmitting pulses having a frequency which increases progressively during each pulse period from a frequency f to a frequency f+$\Delta$f, and an echo signal receiver arrangement comprising a pair of echo signal receiver transducers arranged in spaced apart relationship for receiving an echo signal, a first mixer having two input signal terminals and an output terminal, a second mixer having two input terminals and an output terminal, one input terminal of said second mixer being fed from one transducer of the pair, the other input terminal of the second mixer being fed with a local oscillator signal, said second mixer producing a mixer output signal at said output terminal of said second mixer, a first filter connected to the output terminal of the second mixer for producing one side band output signal of said mixer output signal from the said second mixer, said one side band output signal being fed to one input terminal of the said first mixer, the other input terminal of said first mixer being fed from the other transducer of the pair, said first mixer producing a further mixer output signal at said output terminal of said first mixer, and a plurality of band pass filters forming a filter bank connected to the output terminal of the first mixer, the filters of the bank each having a different pass band slot wherein all slot of said filters in aggregate cover a predetermined frequency band, one of said filters indicating the bearing of the target from which an echo signal is received in accordance with the corresponding slot in which the echo signal is received.

2. A target location system as claimed in claim 1, wherein the said first filter is a high pass filter.

3. A target location system as claimed in claim 1, including a third mixer having two input terminals and an output terminal, and a second filter connected between the output terminal of the third mixer and said first mixer, the said other transducer being connected to one input terminal of the third mixer, the other input terminal of the third mixer being fed with a further local oscillator signal, the third mixer producing an additional mixer output signal at the output terminal of the third mixer, the local oscillator signal fed to the second mixer being at a frequency which is a harmonic of the further local oscillator signal which is fed to the third mixer, and the second filter being arranged to pass one side band of the additional mixer output signal from the third mixer to the first mixer.

4. A target location system as claimed in claim 3, wherein the first and second filters are low pass filters.

5. A target location system as claimed in claim 4, wherein the first mixer comprises a multiplicative mixer.

6. A target location system as claimed in claim 2, wherein the first mixer is an additive mixer, said system including an envelope detector connected between the first mixer and the filter bank.

7. A target location system as claimed in claim 1, wherein the signal receiver transducers are used in a sonar system.

8. A target location system as claimed in claim 1, wherein the echo signal receiver arrangement is used as a radar signal receiver.

* * * * *